United States Patent [19]
Unuma et al.

[11] Patent Number: 5,943,463
[45] Date of Patent: Aug. 24, 1999

[54] COLOR IMAGE SENSOR AND A PRODUCTION METHOD OF AN OPTICAL WAVEGUIDE ARRAY FOR USE THEREIN

[75] Inventors: Yutaka Unuma, Matsudo; David Heard, Kashiwa; Akio Miyata, Abiko; Manabu Fujimoto, Kashiwa; Hisako Arai, Kashiwa; Teruyuki Kataoka, Kashiwa, all of Japan

[73] Assignee: Sharp Kabushiki Kaisha, Osaka, Japan

[21] Appl. No.: 08/877,568

[22] Filed: Jun. 17, 1997

[30] Foreign Application Priority Data

| | | | |
|---|---|---|---|
| Jun. 17, 1996 | [JP] | Japan | 8-155453 |
| Feb. 28, 1997 | [JP] | Japan | 9-046531 |
| Apr. 18, 1997 | [JP] | Japan | 9-102180 |

[51] Int. Cl.$^6$ ............................................. G02B 6/04
[52] U.S. Cl. ........................... 385/119; 385/121; 385/89; 385/93; 385/33
[58] Field of Search ................... 385/115, 119, 385/120, 121, 33, 34, 35, 88, 89, 93

[56] References Cited

U.S. PATENT DOCUMENTS

| | | | |
|---|---|---|---|
| 5,061,036 | 10/1991 | Gordon | 385/116 |
| 5,136,674 | 8/1992 | Kakiuchi et al. | 385/115 |
| 5,655,043 | 8/1997 | Davies et al. | 385/119 |
| 5,815,624 | 9/1998 | Rosenberg | 385/115 |

FOREIGN PATENT DOCUMENTS

| | | |
|---|---|---|
| 3171865 | 7/1991 | Japan . |
| 7301730 | 11/1995 | Japan . |
| WO8301882 | 5/1983 | WIPO . |
| WO8801078 | 2/1988 | WIPO . |

*Primary Examiner*—Hung N. Ngo

[57] ABSTRACT

A color image sensor has a white fluorescent tube as a light source, a microlens array with three rows of microlenses arranged vertically, a three-layer optical waveguide array and a three-line color CCD with color filters. The waveguides in each waveguide array layer are bent so that the interval between successive waveguides becomes narrower from the input end toward the output end. The three-line color CCD has three lines of light-receiving elements (photodiodes) as the light sensing portion. These lines in the light-receiving element array are arranged vertically at the same intervals as the waveguide layers are arranged. Further, a cylindrical lens is attached to cover the microlens array. Because of the presence of this cylindrical lens, the images of light beams incident on different microlenses of the microlens array corresponding to different waveguide layers are the same image from an identical area on the original.

12 Claims, 15 Drawing Sheets

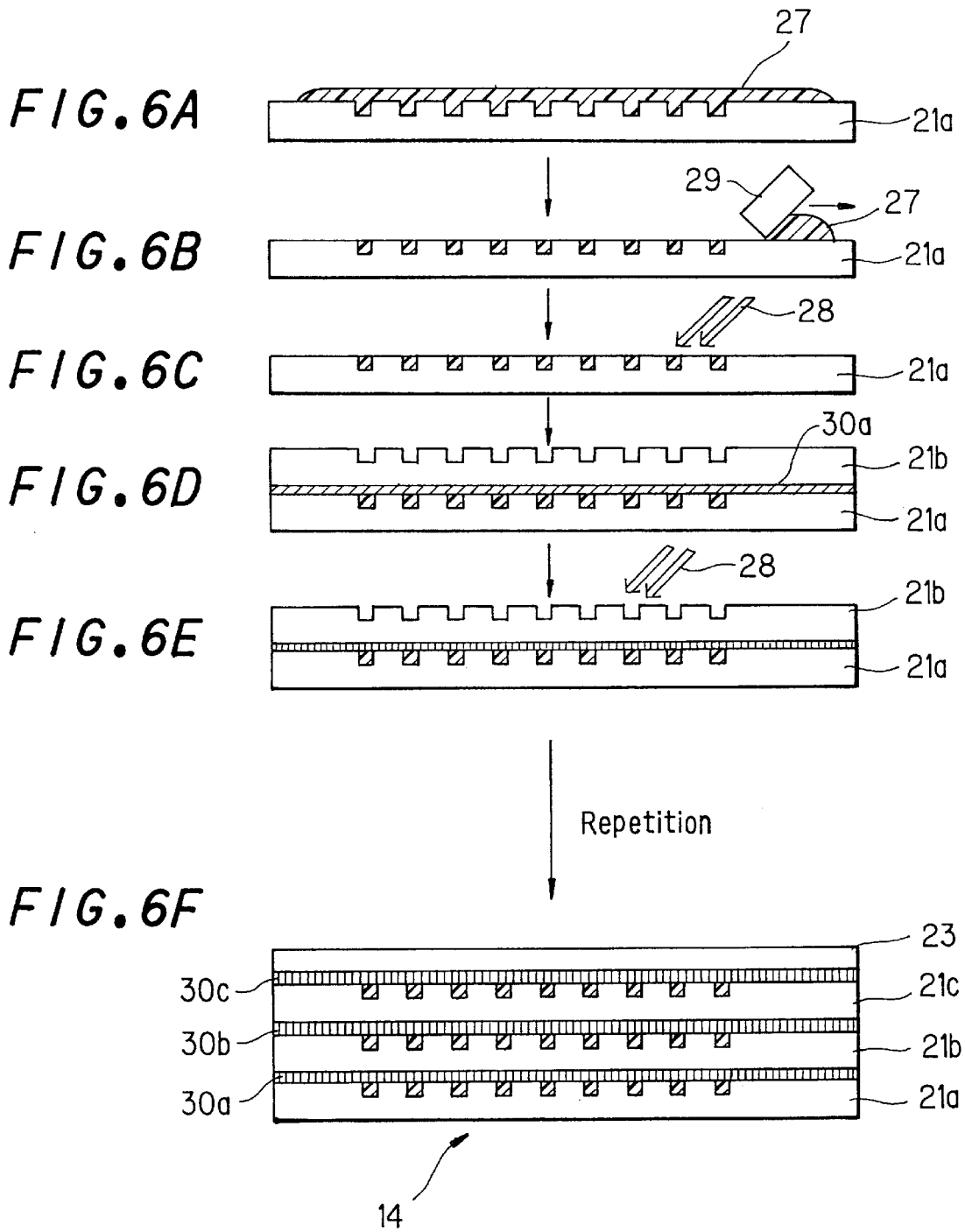

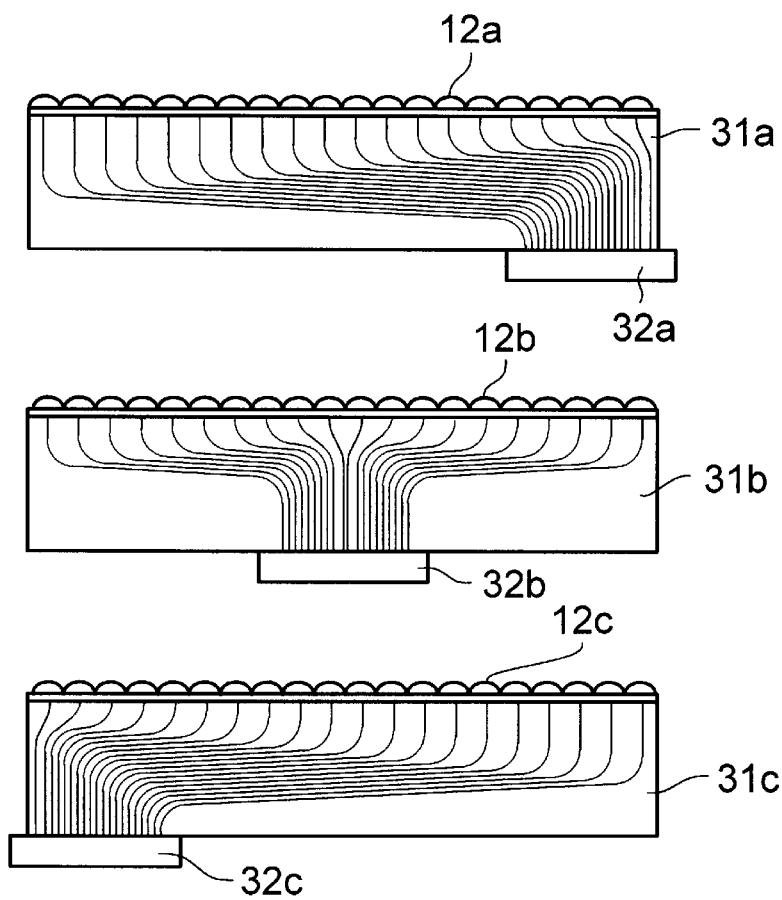
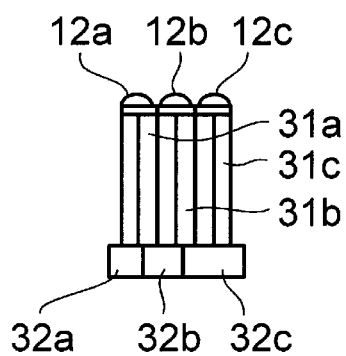
FIG.8A
FIG.8B
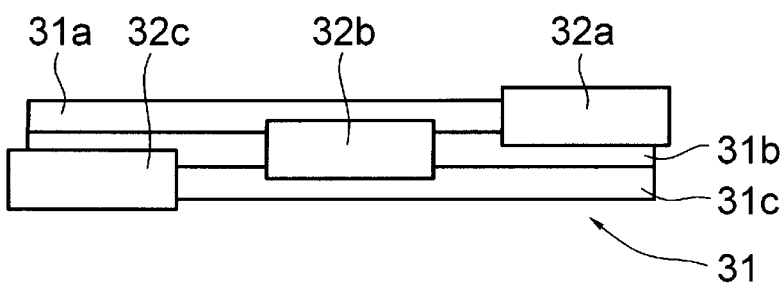
FIG.8C

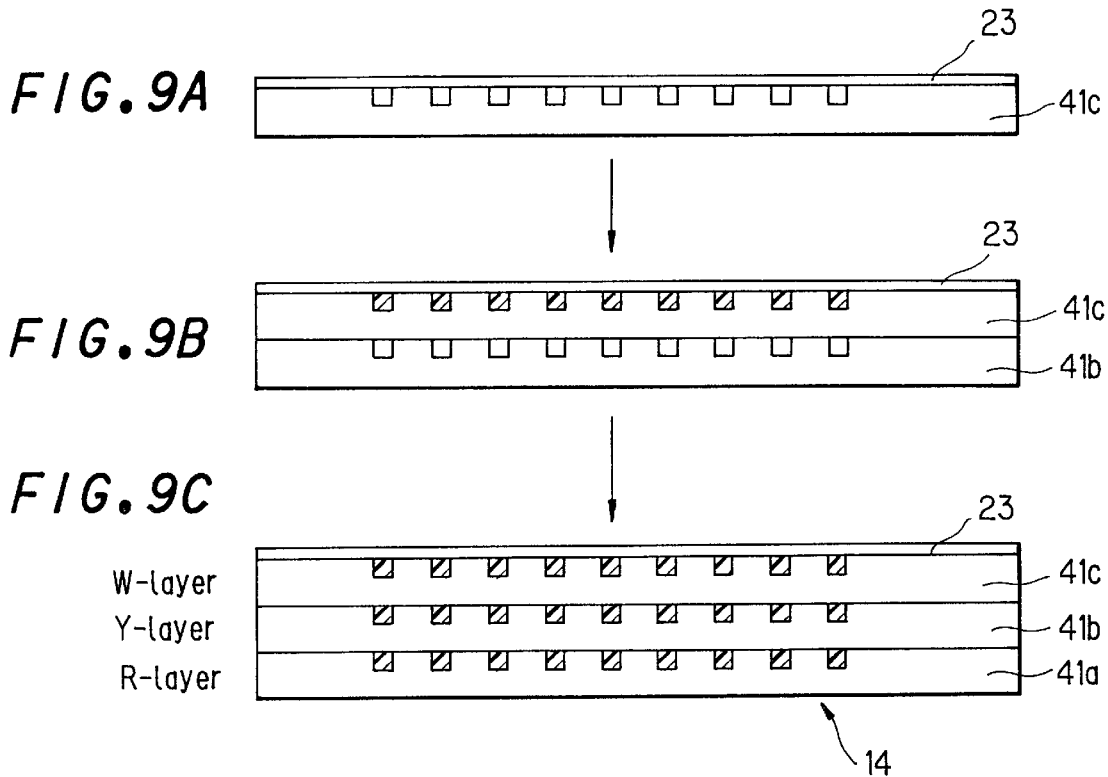
FIG. 9A
FIG. 9B
FIG. 9C
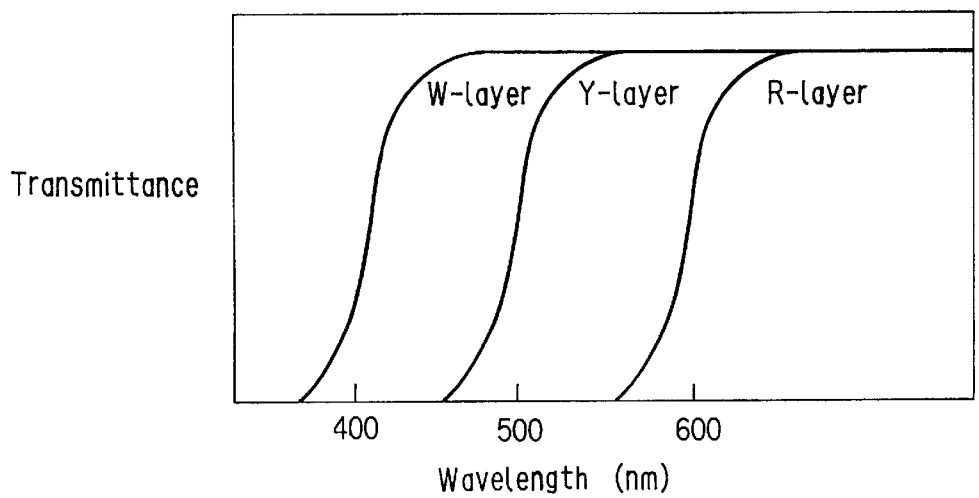
FIG. 10

COLOR IMAGE SENSOR AND A PRODUCTION METHOD OF AN OPTICAL WAVEGUIDE ARRAY FOR USE THEREIN

BACKGROUND OF THE INVENTION

(1) Field of the Invention

The present invention relates to a color image sensor for use in an optical scanning system for hard copy images, in particular it relates to a color image sensor fabricated using optical waveguides and a production method of an optical waveguide array for use therein.

(2) Description of the Background Art

In recent years, with the increased demand for image reading in facsimile machines, image scanners, digital copiers etc., there has been demand for high-performance and compact image sensors which convert image information into electric signals. Conventionally, image sensors which sequentially scan linear sections of the image include a contact type sensor (also called an isometric type sensor) which picks up an isometrically focused image using an optical system having a sensor length corresponding to the width of the original, and a reduction type sensor which picks up a focused image using an image reducing optical system with a sensor length shorter than the width of the original. The contact type image sensor has a structure in which reflected light from the original is guided to a photoelectric converting element through a SELFOC lens array. The reduction optical type image sensor has a structure in which reflected light from the original is guided to a photoelectric converting element using a single lens and mirrors (to be referred to hereinbelow as lens reduction optical type image sensor).

In the field of image sensors, evolution into color is being promoted. Techniques for color recognition include: a method of switching between three types of color filters; a method of switching between three colors of light sources; a method of using a sensor with color separation filters; and the like. In the technique using different color filters, a single line CCD is used for scanning and the light is turned on and off for each color at a certain point on the optical path. In the technique using different light sources, three color light sources are activated in turn for each line. A sensor with color separation filters uses RGB filters attached in the front of the photoelectric converting element; for example, a three-line color CCD in which three color filters are applied to respective lines.

Applied to the lens reduction optical image sensors are the method of using three types of color filters, the method of using a sensor with color separation filters, the method of switching between three colors of light sources, and the like. The contact type image sensor can use the light source changing method, the method of using a sensor with color separation filters, and the like.

Since the SELFOC lens array is made so as to be in close contact with the photoelectric converting element in a contact type image sensor, the sensor of this type has the advantage of being compact in the light propagating direction. However, this sensor needs to have the same sensor length as the width of the original, thus making the price of the photoelectric converting element considerably expensive and increasing the price of the image sensor. Further, the sensor of this type has a shallow depth of field, presenting drawbacks in that any variation in the distance between the original and the SELFOC lens array is liable to cause a blurred out-of-focus image.

A reduction optical type image sensor has a good depth of field and reduces the images by use of a lens. This feature makes the photoelectric converting element compact, presenting an advantage in the cost of the whole image sensor. However, since the reduction optics use a focusing process and mirror reflection, needing a greater optical distance, there is a limit to its compactness with respect to the light propagating direction. Further, the adjustment of the optical system is complicated, resulting in a lack of mechanical stability and reliability.

To deal with this, an optical reduction type image sensor which uses optical waveguides has been developed. This optical reduction type image sensor of optical waveguide type performs reduction of images using the reflected light from the original surface and comprises an array of microlenses having a width the same as the original surface, an optical waveguide substrate formed with a plurality of waveguides conducting light focused by the lens, and a photoelectric converting element array which converts the light introduced from the multiple optical waveguides into electric signals. This configuration makes the device cheaper, more compact and thinner, needing no complex adjustment of the optical system (Japanese Patent Application Laid-Open Hei 7 No. 301730).

The color reading method for this optical waveguide reduction optical type image sensor can be realized by shaping a single waveguide into three branches with RGB (red, green and blue) filters attached to their exits. In this case, two types of arrangements have been proposed: one in which three branches are formed within the waveguide substrate; and the other in which three branches are formed perpendicular to the substrate (Japanese Patent Application Laid-Open Hei 3 No. 171,865).

However, the above optical waveguide type optical reduction type image sensor of the three branched type involves the following problems in the production. First, although it is easy to create two branches for dividing optical energy into halves, it is difficult to divide the waveguide into three branches because the pitch becomes shorter. Even if three branches can be formed successfully within the substrate plane, all the output ends must be provided with RGB color filters in proper order; this makes for a complicated assembly process. When three branches are arranged perpendicular to the substrate, a linear RGB color filter can be used making the assembly simpler, but no appropriate mass production method for producing three branches in the perpendicular direction has been found at present.

SUMMARY OF THE INVENTION

It is therefore an object of the present invention to provide a compact, light-weight and inexpensive color image sensor using an optical waveguide reduction optical system, which is easy to fabricate and can achieve high-speed image reading operations whilst suppressing the occurrence of colors being blurred when color CCDs are used for color recognition, with only using a minimum number and capacity of external memories. The present invention also aims at providing a production method of an optical waveguide array used for the color image sensors.

The present invention has been devised to attain the above objects, and the basic feature is that the color image sensor includes: a white light source radiating white light on the original; an array of microlenses for condensing light which is emitted from the white light source and reflected from the original; an optical waveguide array having a plurality of waveguides which transmit the focused light coupling into the guide by the lens; and a photoelectric converting device which receives light transmitted through the waveguides and converts the light into electric signals. The present invention also is directed to a production method of the optical waveguide array used for the color image sensor. The detailed features are summarized as follows:

In accordance with the first aspect of the invention, a color image sensor includes:

a white light source radiating white light on the original;

an array of microlenses for condensing light which is emitted from the white light source and reflected from the original;

an optical waveguide array having a plurality of waveguides which transmit the light which has been focused by the microlenses;

a photoelectric converting device which receives light transmitted through the waveguides and converts the light into electric signals, and is characterized in that the optical waveguide array has a laminated structure made up of three waveguide layers, with each waveguide layer having one of three color filters which allow light to form three independent color beams that cover the complete range of colors.

In accordance with the second aspect of the invention, a color image sensor having the above first feature is characterized in that the color filters are of red, green and blue.

In accordance with the third aspect of the invention, a color image sensor includes:

a white light source radiating white light on the original;

an array of microlenses for condensing light which is emitted from the white light source and reflected from the original;

an optical waveguide array having a plurality of waveguides which transmit the light which has been focused by the microlens;

a photoelectric converting device which receives light transmitted through the waveguides and converts the light into electric signals, and is characterized in that the optical waveguide array has a laminated structure made up of three waveguide layers, with each waveguide layer having a different core substance of three kinds for creating three types of waveguides which allow light to form three independent color beams that cover the complete range of colors.

In accordance with the fourth aspect of the invention, a color image sensor includes:

a white light source radiating white light on the original;

an array of microlenses for condensing light which is emitted from the white light source and reflected from the original;

an optical waveguide array having a plurality of waveguides which transmit the light which has been focused by the microlens; and a photoelectric converting device which receives light transmitted through the waveguides and converts the light into electric signals, and is characterized in that the optical waveguide array has a laminated structure made up of three layers of waveguides and clad layers over the waveguides, with each clad layer having a different clad substance for creating three kinds of waveguides which allow light to form three independent color beams that cover the complete range of colors.

In accordance with the fifth aspect of the invention, a color image sensor having the above first feature is characterized in that the photoelectric converting device comprises a one-chip sensor having light-receiving elements arranged in three lines, with the interval between the lines of the elements set equal to the interval between the layers of the optical waveguides and is arranged in such a manner that each of the lines of light-receiving elements is made correspondent to a respective waveguide layer of the optical waveguide array.

In accordance with the sixth aspect of the invention, a color image sensor having the above second feature is characterized in that the photoelectric converting device comprises a one-chip sensor having light-receiving elements arranged in three lines, with the interval between the lines of the elements set equal to the interval between the layers of the optical waveguides and is arranged in such a manner that each of the lines of light-receiving elements is made correspondent to a respective waveguide layer of the optical waveguide array.

In accordance with the seventh aspect of the invention, a color image sensor having the above third feature is characterized in that the photoelectric converting device comprises a one-chip sensor having light-receiving elements arranged in three lines, with the interval between the lines of the elements set equal to the interval between the layers of the optical waveguides and is arranged in such a manner that each of the lines of light-receiving elements is made correspondent to a respective waveguide layer of the optical waveguide array.

In accordance with the eighth aspect of the invention, a color image sensor having the above fourth feature is characterized in that the photoelectric converting device comprises a one-chip sensor having light-receiving elements arranged in three lines, with the interval between the lines of the elements set equal to the interval between the layers of the optical waveguides and is arranged in such a manner that each of the lines of light-receiving elements is made correspondent to a respective waveguide layer of the optical waveguide array.

In accordance with the ninth aspect of the invention, a color image sensor having the first feature of the invention is characterized in that the photoelectric converting device comprises a one-chip sensor having light-receiving elements arranged in one line, the optical waveguide array is constructed so that the waveguide output portions of different layers are arranged without overlapping each other, and each of the waveguide layers of the optical waveguide array is arranged in correspondence with the light-receiving elements of a different photoelectric converting device.

In accordance with the tenth aspect of the invention, a color image sensor having the second feature is characterized in that the photoelectric converting device comprises a one-chip sensor having light-receiving elements arranged in one line, the optical waveguide array is constructed so that the waveguide output portions of different layers are arranged without overlapping each other, and each of the waveguide layers of the optical waveguide array is arranged in correspondence with the light-receiving elements of a different photoelectric converting device.

In accordance with the eleventh aspect of the invention, a color image sensor having the above third feature is characterized in that the photoelectric converting device comprises a one-chip sensor having light-receiving elements arranged in one line, the optical waveguide array is constructed so that the waveguide output portions of different layers are arranged without overlapping each other, and each of the waveguide layers of the optical waveguide array is arranged in correspondence with the light-receiving elements of a different photoelectric converting device.

In accordance with the twelfth aspect of the invention, a color image sensor having the above fourth feature is characterized in that the photoelectric converting device comprises a one-chip sensor having light-receiving elements arranged in one line, the optical waveguide array is constructed so that the waveguide output portions of different layers are arranged without overlapping each other, and each of the waveguide layers of the optical waveguide array is arranged in correspondence with the light-receiving elements of a different photoelectric converting device.

In accordance with the thirteenth aspect of the invention, a color image sensor includes:

a white light source radiating white light on the original;

an optical waveguide array having a plurality of waveguides which transmit the light which has been focused by the lens system;

a photoelectric converting device which receives light transmitted through the waveguides and converts the light into electric signals;

a lens system comprising a three-layer microlens array which focuses light on to each of the waveguides and a cylindrical lens which is disposed between the original and the microlens array and transmits the reflected light from the same part of the original to the microlens array; and the optical waveguide array having a laminated structure of three layers of waveguides, and is characterized in that the light beams outputted from the three waveguide layers of the optical waveguide array are supplied to the photoelectric converting device, where the light is converted into light signals forming three independent colors that cover the complete range of colors.

In accordance with the fourteenth aspect of the invention, a color image sensor having the above thirteenth feature is characterized in that the lens is constructed such that the cylindrical lens has the microlens array integrated therewith on the optical waveguide array side thereof.

In accordance with the fifteenth aspect of the invention, a color image sensor includes:

a white light source radiating white light on the original;

an optical waveguide array having a plurality of waveguides which transmit the light which has been focused by the lens system;

a photoelectric converting device which receives light transmitted through the waveguides and converts the light into electric signals;

the lens system comprising a three-layer microlens array which focuses light on to each of all the waveguides; and the optical waveguide array having a laminated structure of three layers of waveguides, and is characterized in that the interval of the microlenses with respect to the laminated direction in the microlens array is set so that the reflected light beams from an identical area of the original with respect to the layered direction are focused on respective input ends of the three layered optical waveguides, and the light beams outputted from the three waveguide layers of the optical waveguide array are supplied to the photoelectric converting device, where the light is converted into light signals forming three independent colors that cover the complete range of colors.

In accordance with the sixteenth aspect of the invention, a production method of an optical waveguide array includes the steps of:

forming three layered hollow tubes by laminating clad substrates having a plurality of grooves for waveguides formed on the surface thereof;

filling up the hollow tubes with a solution containing a core material for waveguides by a capillary suction process; and causing the core material to polymerize so as to create an optical waveguide array having three layers of waveguides.

In accordance with the seventeenth aspect of the invention, a production method of an optical waveguide array includes the steps of:

forming a layer of hollow tubes in such a manner that a clad substrate having a plurality of grooves for waveguides formed on the surface thereof is covered with another clad substrate in close contact therewith;

filling up the hollow tubes with a solution containing a core material for waveguides by a capillary suction process;

causing the core material to polymerize; and forming another layer by placing another clad substrate in close contact therewith to repeat the same operation so as to create an optical waveguide array having three layers of waveguides.

In accordance with the eighteenth aspect of the invention, a production method of an optical waveguide array includes the steps of:

applying a core material for waveguides over a surface of a clad substrate having a plurality of grooves formed thereon;

laminating three substrates each having a core material applied thereon to form three layered waveguides under pressure so that they adhere to each other; causing the core materials to polymerize so as to create an optical waveguide array having three layers of waveguides.

In accordance with the nineteenth aspect of the invention, a production method of an optical waveguide array includes the steps of:

applying a core material for waveguides over a surface of a clad substrate with a plurality of grooves formed thereon;

filling up the grooves with the core material and removing the excess material with a squeegee;

causing the core material to polymerize;

applying a clad material having an index of refraction lower than the core material, on the top of the substrate;

causing the clad material to polymerize forming a clad layer; and repeating the same operations an additional two times so as to create an optical waveguide array having three layers of waveguides.

In accordance with the twentieth aspect of the invention, a production method of an optical waveguide array having the above seventeenth feature is characterized in that three types of the core material are used for different layers of waveguides, each of the core material having a different color pigment mixed therein for creating three kinds of waveguides which allow light to form three independent color beams that cover the complete range of colors.

In accordance with the twenty-first aspect of the invention, a production method of an optical waveguide array having the above eighteenth feature is characterized in that three types of the core material are used for different layers of waveguides, each of the core material having a different color pigment mixed therein for creating three kinds of waveguides which allow light to form three independent color beams that cover the complete range of colors.

In accordance with the twenty-second aspect of the invention, a production method of an optical waveguide array having the above nineteenth feature is characterized in that three types of the core material are used for different layers of waveguides, each of the core material having a different color pigment mixed therein for creating three kinds of waveguides which allow light to form three independent color beams that cover the complete range of colors.

In accordance with the twenty-third aspect of the invention, a production method of an optical waveguide array having the nineteenth feature is characterized in that three types of the clad material are used for different clad layers, each of the clad materials having a different color pigment mixed therein for creating three kinds of waveguides which allow light to form three independent color beams that cover the complete range of colors.

Since, the optical waveguide array of the invention has a laminated structure consisting of three-layered waveguides, the fabrication of the optical waveguides is performed more easily than that of a three-branched type color image sensor. The three color filters which, by allowing light to pass therethrough, form three color beams that are able to produce white light when they are mixed, are made correspondent to each of the waveguide layers, in a one-to-one correspondence so that the color beams are converted into electric signals by a photoelectric converting device, or a line sensor. Therefore, the RGB signals for color recognition can be obtained easily by signal processing, compared to the case of a three-branched type image sensor whereby color information is picked up by color filters. When the RGB color filters are used, it is possible to directly obtain RGB signal without performing any signal processing. Further, when three kinds of materials which allow light to form three independent color beams that cover the complete range of colors is used to produce waveguides, it becomes no longer necessary to provide color filters, thus achieving a simplified fabrication process.

In the features of the invention shown in other embodiments, the cylindrical lens is arranged on the microlens array. Thereby, the image of light incident on each of the three microlenses corresponding to different waveguide layers is identical to one from the same portion on the original. As a result, light from the same area on the original is focused on each of the waveguide layers of the optical waveguide array, thus preventing the reading position from deviating.

Further, in accordance with the invention, since the cylindrical lens has a microlens array integrally formed on the optical waveguide side thereof, the same effects as mentioned above can be obtained. This integrated configuration of the cylindrical lens and the microlens array by integral molding can reduce the number of components.

Finally, in the configuration of the invention, with no cylindrical lens used, the interval between successive three optical waveguide layers is set greater than the interval between successive lines of the microlens array at right angles to the laminated direction of the optical waveguide layers. The intervals between successive lines of the microlens array in the laminated direction is set so that reflected light beams from an identical area on the original with respect to the layered direction of the microlens array, are adapted to be focused at respective input ends of the three layered optical waveguides. Of the three rows of the microlens array, light incident on microlenses in the middle rows form images at positions along respective optical axes of the microlenses in the middle row. Light incident on the microlenses in the outer rows forms images at positions deviated from respective optical axes of the microlenses of the outer layers. However, since the interval of optical waveguide layers is set taking this deviation into account, images can be focused at the positions corresponding to the outer optical waveguide layers.

BRIEF DESCRIPTION OF THE DRAWINGS

FIGS. 6A–6F are illustrative views for explaining the production of an optical waveguide array by a squeegeeing method;

FIGS. 8A–8C are configurational views showing the color image sensor;

FIGS. 9A–9C are illustrative views for explaining the production of an optical waveguide array of a color image sensor of the third embodiment in accordance with the invention;

FIG. 10 is a characteristic view showing transmission spectra of waveguide layers W, Y and R;

DESCRIPTION OF THE PREFERRED EMBODIMENTS

The embodiments of the present invention will hereinafter be described in detail with reference to the accompanying drawings.

1st Embodiment

Figure 1:
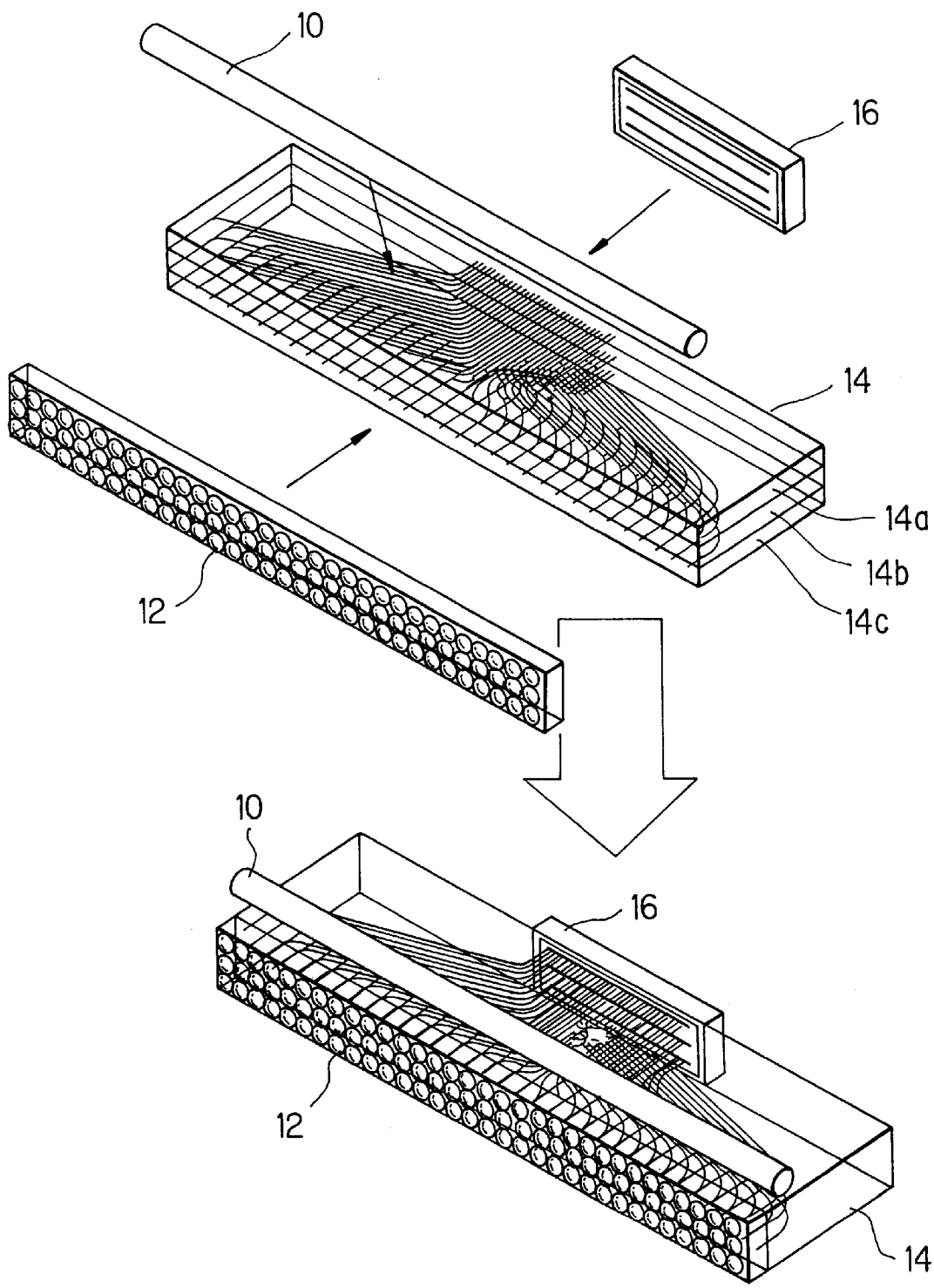
FIG. 1 is a configurational perspective view showing a color image sensor of the first embodiment in accordance with the invention.

FIG. 1 is a perspective view showing the structure of the first embodiment of a color image sensor in accordance with this invention. This color image sensor has a resolution of 200 dpi and comprises a white fluorescent tube 10 as a white light source, a vertically arranged three-row microlens array 12, a three layered optical waveguide array 14, and three-line color CCD with built-in filters 16.

In microlens array 12, microlenses are arranged at intervals of 125 $\mu$m in the horizontal direction and at intervals of 105 $\mu$m in the vertical direction. Optical waveguide array 14 has a red optical waveguide array layer 14a and a green optical waveguide array layer 14b and a blue optical waveguide array layer 14c. Each layer is formed with 105 $\mu$m in thickness. Each array layer has waveguides formed at intervals of 125 $\mu$m on the input side and at intervals of 10.5 $\mu$m on the output side. Briefly, each waveguide is bent within each optical waveguide array layer 14a, 14b and 14c so that the distance between successive optical waveguides is reduced from the input side to the output side. Three-line color CCD 16 has light-receiving elements (photodiodes) in its light sensing portion disposed at intervals of 10.5 $\mu$m in the horizontal direction. The lines of the light receiving element array are disposed at intervals of 105 $\mu$m in the vertical direction. Each one of the light-receiving element arrays is provided with either a red, green or blue color filter. The incoming light passes through the color filter thus reaching the light-receiving elements.

Figure 2:
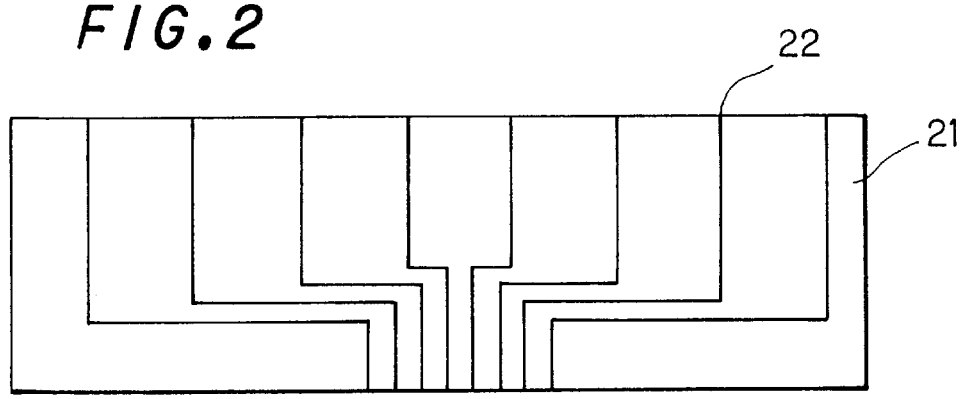
FIG. 2 is a top view of a clad substrate.

Now, the production method of an optical waveguide array 14 will be explained. The clad substrate for optical waveguide array 14 may be formed from a material such as PMMA (polymethyl-methacrylate), acrylic plastic, glass, etc. which is transparent and has an index of refraction lower than the material of the core portion forming the waveguides. FIG. 2 shows a top view of this clad substrate. Formed on the surface of a clad substrate 21 are grooves 22 for forming waveguides. Grooves 22 are 8 $\mu$m in width, 8 $\mu$m in depth and formed at intervals of 125 $\mu$m in the input portion and at intervals of 10.5 $\mu$m in the output portion. Each groove is bent about 90° at two sites between the input and output portions within the surface of clad substrate 21. Grooves 22 are formed by masking the areas excluding the grooves and cutting out the portions which are not masked using a RIE (reactive ion etching) process, ion milling, laser process and the like. It is also possible to form a clad substrate 21 having grooves 22 by injection molding. Three clad substrates 21 with the groove pattern are prepared in the above way.

Figure 3:
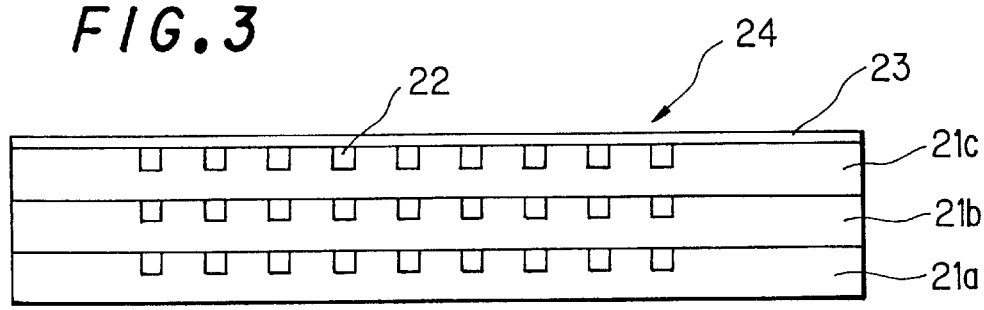
FIG. 3 is a sectional view of an optical waveguide forming substrate with a clad substrate laminated thereon.
Figure 4:
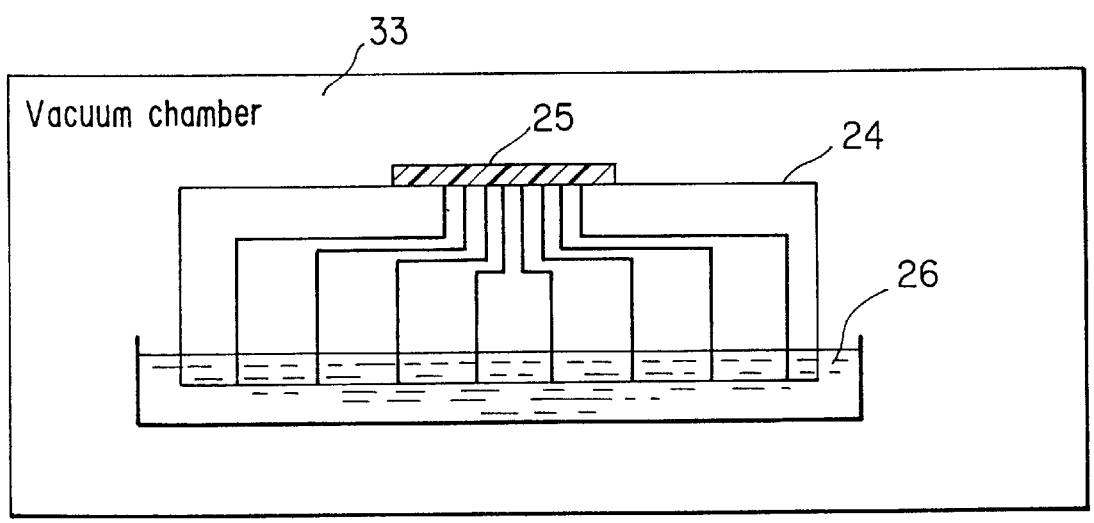
FIG. 4 is an illustrative view for explaining a capillary suction method.

FIG. 3 shows an optical waveguide forming substrate within which these clad substrates have been laminated. Three clad substrates 21a, 21b and 21c are affixed to each other with one groove forming surface in contact with the next non-grooved surface. A flat plate 23 with no grooves is affixed to the groove forming surface of clad substrate 21c. In this way, an optical waveguide forming substrate 24 is formed having three layers of arrays of hollow tubes for forming the core portions. The distances between clad substrates 21a, 21b and 21c are formed corresponding to the line intervals of the three-line CCD, i.e., 105 $\mu$m. As shown in FIG. 4, the output end face of optical waveguide forming substrate 24 is sealed with vacuum epoxy resin 25 so as to close one end of the core forming hollow tubes.

The injection forming of the core portion is performed by capillary suction using a UV polymerizing substance as the core forming material. As shown in FIG. 4, a mixed solution (monomer solution) 26 containing this substance is put inside a vacuum chamber 33 then, gases dissolved in the solution are removed by reducing the pressure. Then, the pressure inside vacuum chamber 33 is reverted back to atmospheric pressure and the aforementioned optical waveguide forming substrate 24 is set hanging therein with the open end of the hollow tubes down. Again, vacuum chamber 33 is evacuated and then optical waveguide forming substrate 24 is moved downwards so that the lower end is dipped into mixed solution 26. The liquid is sucked upward into the hollow tubes due to capillary effect. When the pressure inside vacuum chamber 33 is reverted back to the atmospheric pressure, the liquid is further pressed up due to the differential pressure between the hollow tubes and the external portion, thus the hollow tubes become totally filled with the liquid. Optical waveguide forming substrate 24 is then irradiated with UV light so that the UV polymerizing substance starts to polymerize, forming the cores. In this way, optical waveguide array 14 is formed.

Figure 5A:
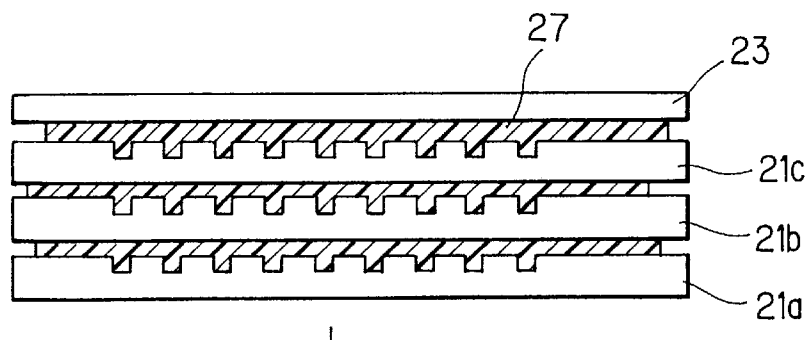
FIGS. 5A–5C are illustrative views for explaining the production of an optical waveguide array by a sandwiching method.
Figure 5B:
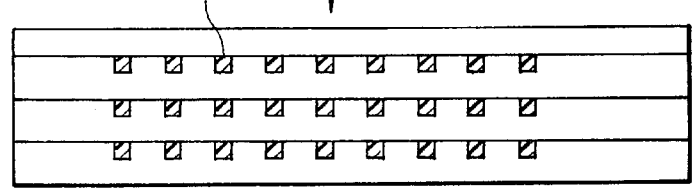
Figure 5C:
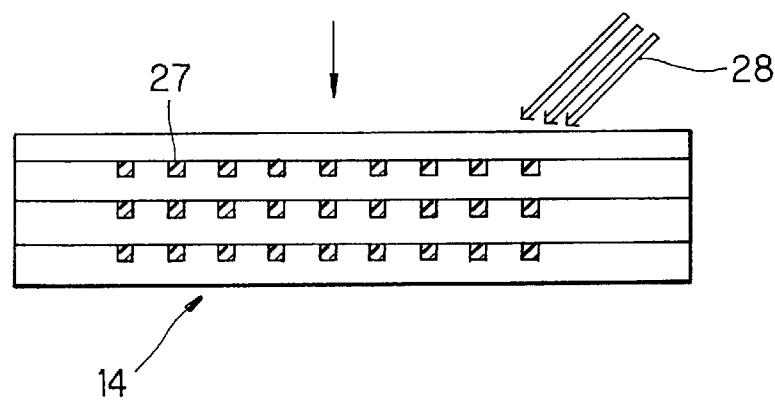

As another core forming method, a sandwiching process may be used. FIGS. 5A–5C are illustrative views showing a forming process of an optical waveguide array by a sandwiching method. A core material 27 is applied on a clad substrate 21 with optical waveguide grooves formed thereon. Another clad substrate 21 is laid over it with its non-grooved surface down. In the same way, three clad substrates 21a, 21b and 21c are laminated in turn and then the core material is applied onto the optical waveguide grooves on the top face, followed by placement of a flat plate 23 with no grooves formed thereon (FIG. 5A). Then all the parts are pressed to make them adhere (FIG. 5B), and then irradiated with UV light 28 to polymerize core material 27, thus forming a three-layer optical waveguide array 14 (FIG. 5C). Finally, the input and output end faces of optical waveguide array 14 are polished using an abrasive.

As still another core forming method, a squeegeeing process may be used. FIGS. 6A–6C are illustrative views showing a forming process of an optical waveguide array by a squeegeeing method. A core material 27 is applied on a clad substrate 21a with optical waveguide grooves formed thereon (FIG. 6A) and then scraped by a squeegee 29 to fill up only the grooves with the core material (FIG. 6B). Then, this is irradiated with UV light to make the material photopolymerize, forming the cores (FIG. 6C). Next, a clad material 30 consisting of a UV polymerizing material having an index of refraction as low as the clad substrate is applied on the cores. Then, clad substrate 21b is laid over clad material 30 with its non-grooved surface down (FIG. 6D). This is irradiated with UV light 28 to make clad material 30 polymerize (see FIG. 6E). This process is repeated so that clad layers 30a, 30b and 30c are laminated on respective three clad substrates 21a, 21b and 21c. A flat plate 23 is laid over the top to complete an optical waveguide array 14 of three-layer waveguide laminated structure (FIG. 6F).

Optical waveguide array 14 thus formed is assembled with necessary components into a color image sensor in the following manner. A microlens array 12 is bonded to the input end face of optical waveguide array 14 in such a manner that each microlens corresponds to one waveguide. The diameter of the microlens is set equal to the distance between successive waveguides and NA (numerical aperture) of the microlens is set identical with that of the waveguide. Thus, the introduction of the reflected light from the original into the waveguide can be maximized while light from the neighboring lenses is prevented from entering, to thereby achieve an improved resolution. A three-line color CCD 16 is bonded to the output end face of optical waveguide array 14 so that each waveguide corresponds to one photodiode in the light sensing portion. A white fluorescent tube 10 is provided over optical waveguide array 14 on the input end side.

Next, the operation of the color image sensor will be described. Light emitted from white fluorescent tube 10 is irradiated at an angle on the original, and the reflected light is guided to the waveguides through microlens array 12. Light passing through respective waveguide array layer 14a, 14b and 14c reaches three-line color CCD 16 where the light is converted into electric signals. In practice, this color image sensor is moved in a perpendicular direction to the waveguide array layers to pickup image information from the original at intervals corresponding to 200 dpi. The pickup positions of the RGB signals passing through the three layer waveguides deviate from each other depending upon the layer distance, but the output signals from CCD 16 are stored for each color, and delayed to be outputted, thus making it possible to correct the positional deviations.

In this embodiment, the description was made using the RGB color filters, but any three filter combination can be used as long as light beams passing through them are independent from each other to cover the complete range of colors. In this case, based on the light signals detected by the CCD, signal processing should be effected to make them into RGB signals.

The clad substrate with grooves formed on only one side was used, but it is also possible to produce a three-layered waveguide structure by laminating a pair of clad substrates with grooves formed on both sides thereof and placing two one-side groove formed substrates on both sides.

2nd Embodiment

Figure 7:
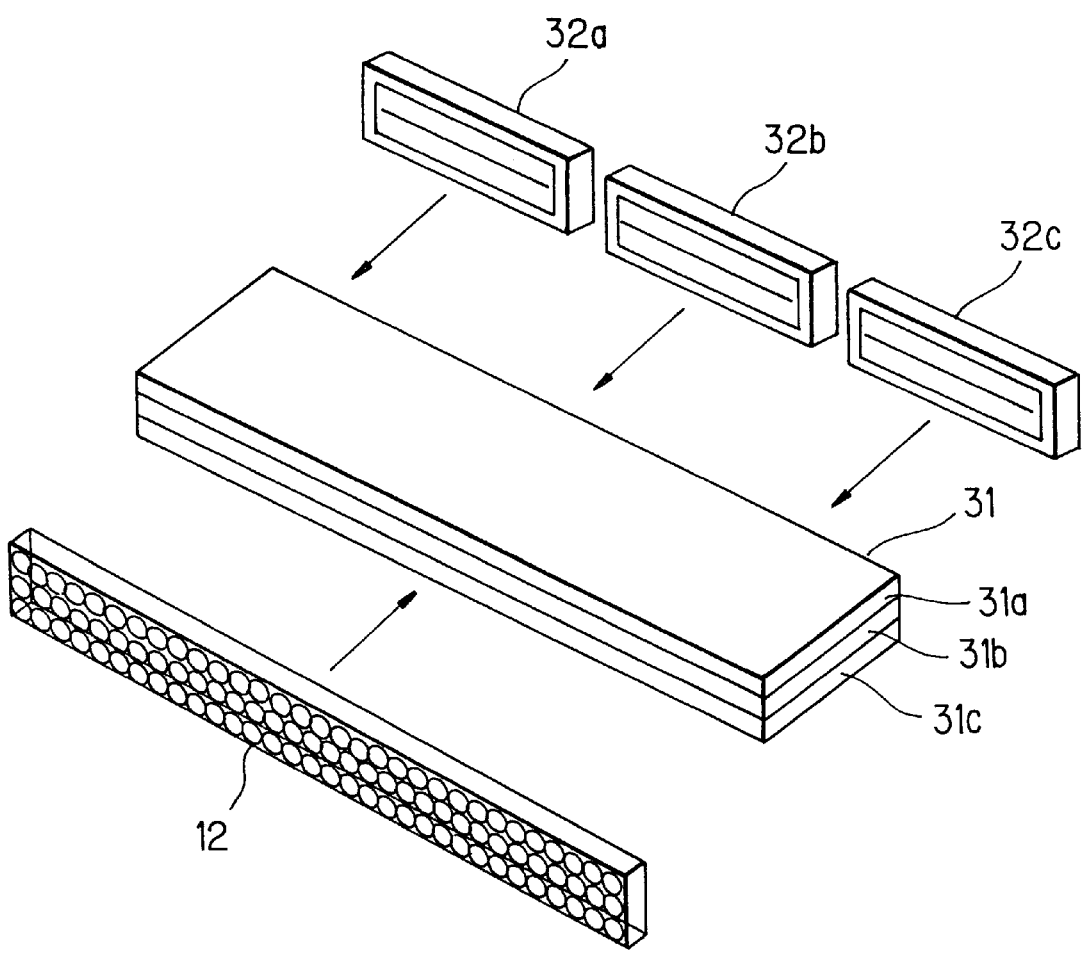
FIG. 7 is an exploded perspective view showing a color image sensor of the second embodiment in accordance with the invention.

FIG. 7 is an exploded perspective view showing the second embodiment of a color image sensor in accordance with the invention. FIGS. 8A–8C are configurational views showing this color image sensor. In FIGS. 8A–8C, FIG. 8A is a top view of each layer of the color image sensor; FIG. 8B is a side view of the color image sensor; and FIG. 8C is a front view showing the color image sensor. In this color image sensor, each layer of RGB waveguides arrays 31a, 31b and 31c has a microlens array 12 on the input side thereof and one-line color CCD 32a, 32b and 32c bonded on the output side. Three one-line color CCDs have respective RGB color filters. As shown in FIG. 8A, red, green and blue waveguide arrays 31a, 31b and 31c are formed so that the output portions of the waveguides arrays are made to come together respectively at the right side, the center and the left side. In this way, the output ends of the waveguide arrays are arranged so that they do not overlap each other with respect to the layer direction. Therefore, as shown in FIG. 8C, it is possible to bond one-line CCDs 32a, 32b and 32c to the output ends from waveguide arrays 31a, 31b and 31c without overlap. As a result, one-line color CCDs 32a, 32b and 32c even with a thickness of 105 µm or more, can be used. In general, one-line color CCDs are much less expensive than three-line color CCDs, so that the image sensor of this embodiment will be less expensive than that of the first embodiment.

3rd Embodiment

The main feature of a color image sensor of the third embodiment is in that the waveguides themselves have color filtering functions without using any color filters. For the description, a color image sensor having the same configurations as in the second embodiment will be used, except in that one-line color CCD has no color filter.

The clad substrate for each layer has waveguide grooves shown in FIG. 9A. First, a flat plate 23 with no grooves is laid over the grooved surface of a clad substrate 41c and made into close contact therewith. The output end face is sealed, and the input end face is dipped into a mixed solution of the core material, as shown in FIG. 4 so that the hollow tubes are filled up with a core material by the aforementioned capillary suction process. In this case, use as the core material is made of a substance which has high transmittance up to the range of 'blue' wavelengths with no pigments mixed therein. This layer will be called a W-layer.

Next, as shown in FIG. 9B, the grooved surface of another clad substrate 41b is laid over the W-layer and made into contact therewith. In a similar manner, the hollow tubes are filled up with a core material by the capillary suction process. As the core material, a substance which is mixed with a bis-azoic dye as a pigment for absorbing the range of 'blue' wavelengths is used. This layer will be called a Y-layer. As shown in FIG. 9C, the grooved surface of another clad substrate 41c is laid over the Y-layer and made into contact therewith. The hollow tubes are filled up with a core material by the capillary suction process. As the core material, a substance which is mixed with a cyanine dye as a pigment for absorbing the range of 'blue and green' wavelengths is used. This layer will be called a R-layer. The transmission spectra of the waveguides of the layers W, Y and R are shown in FIG. 10. It is possible to create the three primary colors by performing subtraction of the spectra of light beams having passed through the W, Y and R-layers. Pigments other than the above, bis-azo dyes and benzothiazole dyes, etc. can be used for the Y-layer, and naphthoquinone dyes and indigo dyes, etc. can be used for the R-layer.

When the sandwiching method or the squeegeeing method is used for the production, a three-layer waveguide structure in which the core materials having different ranges of transmission wavelengths are held between the layers is formed in the manner as shown in FIG. 5 or FIG. 6. Bonded on the input end face are microlenses in alignment with the array of the waveguide input portions, so that each microlens corresponds to one waveguide input portion. Bonded on the output end face are three one-line CCDs so that they are coupled with respective waveguides.

RGB signals as follows are extracted from the signals outputted from one-line color CCDs 32a, 32b and 32c. The blue signal (B) is extracted by subtracting the signal of the Y-layer from the signal of the W-layer. The green signal (G) is extracted by subtracting the signal of the R-layer from the signal of the Y-layer. The signal from the R-layer is used as it is as the red signal (R).

In this way, the waveguides are adapted to have the function of color filters without using any color filters, and consequently, the step for attaching color filters to one-line color CCDs becomes unnecessary, realizing an improved assembly performance.

4th Embodiment

In the third embodiment, the pigment was mixed in the core material, but in this embodiment, pigments will be mixed into the clad layers shown in FIGS. 6A–6F for the first embodiment. Specifically, in FIG. 6F, by creating a waveguide array layer for red wavelengths 21a, a waveguide array layer for green wavelengths 21b and a waveguide array layer for blue wavelengths 21c, each array layer is made to allow red, green or blue light to pass therethrough to the output. As the core material, a transparent substance with no pigments is used as in the first embodiment. As described heretofore, pigments which absorb light in the wavelength ranges of blue and green are mixed into clad layer 30a; pigments which absorb light in the wavelength ranges of red and blue are mixed into clad layer 30b; and pigments which absorb light in the wavelength ranges of red and green are mixed into clad layer 30c. The production process of the optical waveguide array is the same as in FIGS. 6A–6F, therefore the description will be omitted.

Light that propagates through the core layers will have a component that is transmitted through clad layers 30a, 30b and 30c and absorbed by the mixed pigments. As a result, red light is outputted from waveguide array layer for red wavelengths 21a, green light is outputted from waveguide array layer for green wavelengths 21b and blue light is outputted from waveguide array layer for blue wavelengths 21c. In this way, each waveguide has the function of a color filter without using any color filter.

5th Embodiment

Figure 11:
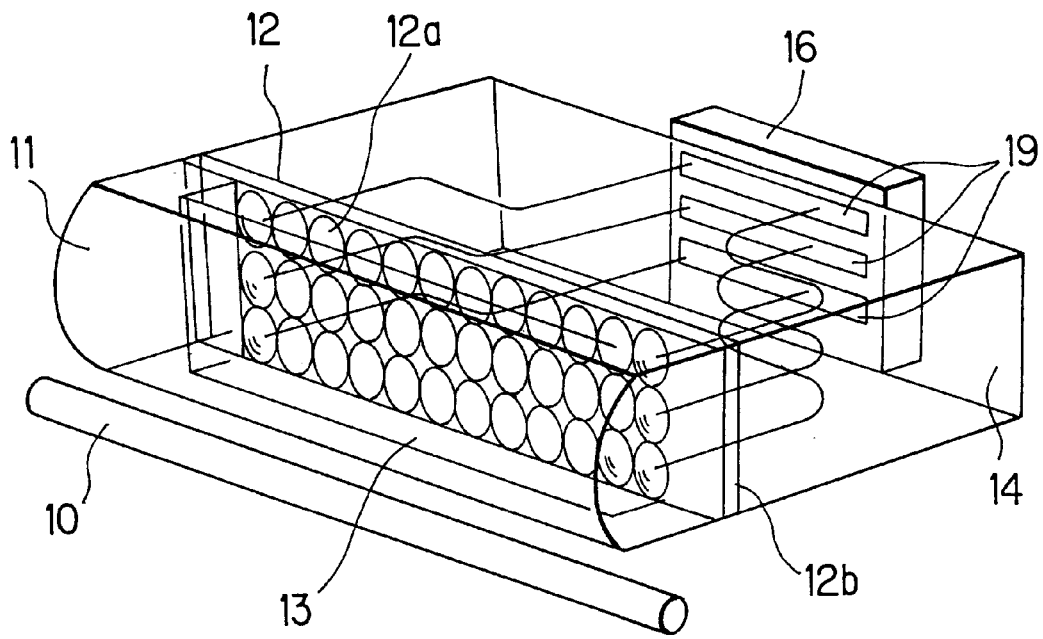
FIG. 11 is a configurational perspective view showing a color image sensor of the fifth embodiment in accordance with the invention.

FIG. 11 is a configurational perspective view showing the fifth embodiment of a color image sensor in accordance with the invention. This color image sensor has an image reading width of A4 size with a resolution of 200 dpi and comprises a white fluorescent tube 10 as a white light source for illuminating the original, a cylindrical lens 11, a vertically arranged three-row microlens array 12, a three-layer optical waveguide array 14, and three-line color CCD with built-in filters 16.

Figure 12:
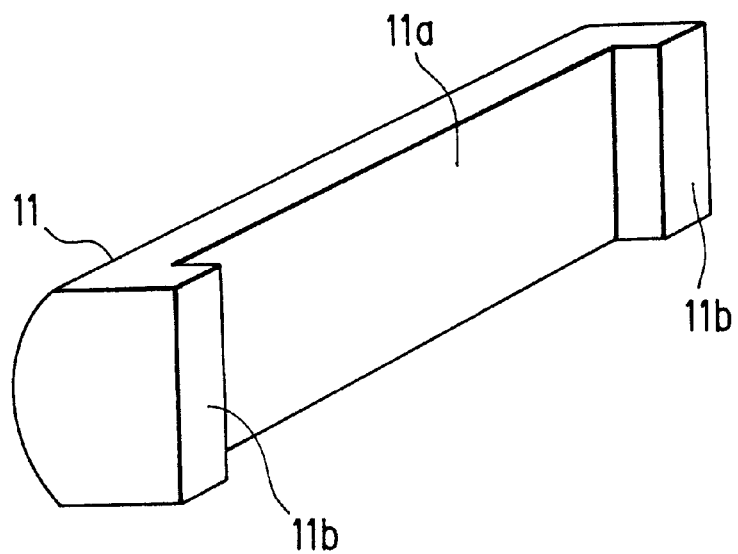
FIG. 12 is a configurational perspective view showing a cylindrical lens used in the fifth embodiment.

Cylindrical lens 11 is attached so as to cover microlens array 12, having a convex surface on the original side and a flat surface on the microlens 12 side, with an effective diameter of 375 μm, a focal length of 1.5 mm, a lens thickness of 220 μm and a length of 220 mm (see FIG. 12). In order to create an air layer 13 between cylindrical lens 11 and microlens array 12, projection steps 11b are formed at both ends on the flat surface 11a (on the microlens side) of cylindrical lens 11. These projection steps 11b are cemented to a microlens array substrate 12b to be referred to hereinbelow. Here, projection steps 11b are designed to correspond to the areas where no microlenses 12 are formed. Projection step 11b has a height of 280 μm with 2 mm width.

Microlens array 12 is composed of three rows of microlenses 12a formed on microlens substrate 12b. Microlenses 12a each have an effective diameter of 125 μm, a focal length of 270 μm and a lens thickness of 425 μm, and are formed on microlens substrate 12b at intervals of 125 μm in the horizontal direction and at intervals of 125 μm in the vertical direction, with margins at both ends thereof. Cemented to these ends of microlens substrate 12b are projection steps 11b of cylindrical lens 11, as described heretofore.

Cylindrical lens 11 and microlens array 12 are made of, for example, polymethyl-methacrylate (PMMA) and produced by injection molding.

In three-layer optical waveguide array 14, waveguide layers constitute optical waveguides for red, green and blue (R, G, B), and are formed at intervals of 125 μm. Waveguide grooves forming waveguides are 8 μm in depth, 8 μm in width, and the waveguides are formed at intervals of 125 μm in the input portion and at intervals of 14 μm in the output portion. The distance between the original and cylindrical lens 11 is set at 1.5 mm.

Now, the production process of a three-layer structure optical waveguide array 14 will be described. There are various producing methods, but a squeegeeing process will be exemplified.

Figure 13A:
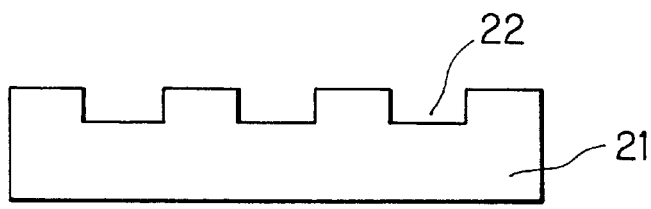
FIGS. 13A–13F are illustrative views showing the production of an optical waveguide by a squeegeeing method.

FIGS. 13A–13F are illustrative views showing the production of optical waveguide array 14 by a squeegeeing process. First, a clad substrate 21 with waveguide grooves 22 formed thereon is prepared (FIG. 13A). Clad substrate 21 may be of a transparent material having a lower index of refraction than that of the core portion constituting the waveguides. For example, polymethyl-methacrylate (PMMA) are used to produce a clad substrate 21 by an injection molding technique.

Figure 13B:
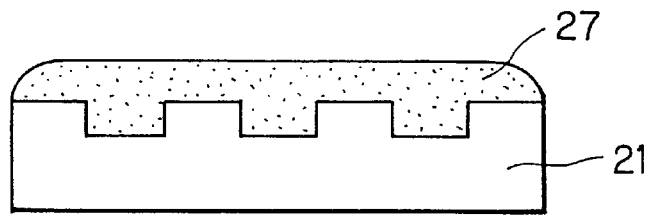
Figure 13C:
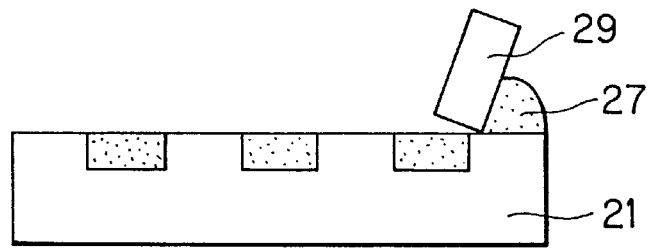
Figure 13D:
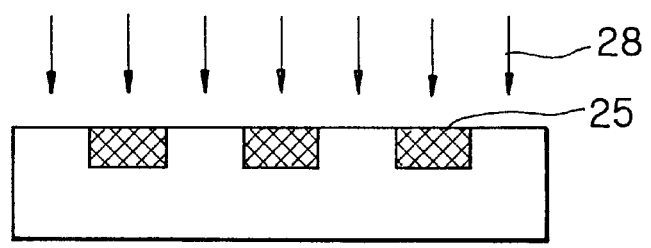
Figure 13E:
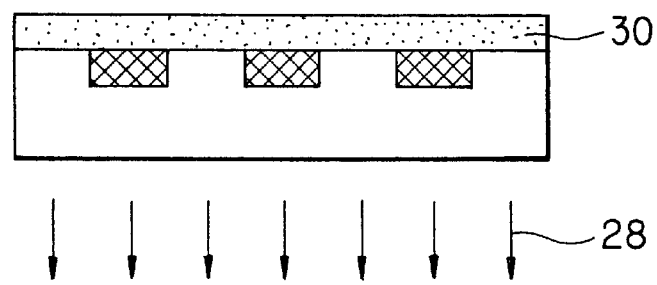
Figure 13F:
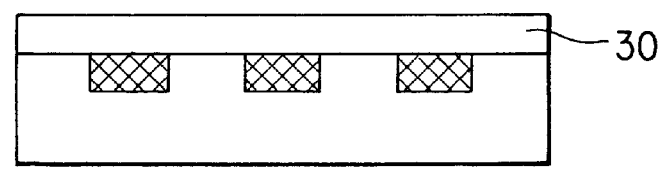

A core material 27 having a higher index of refraction than the clad is applied to the clad substrate 21 (FIG. 13B). Then, the excess core material 27 outside waveguide grooves 22 is scraped off by squeegee 29 (FIG. 13C). After only the waveguide grooves 22 have been left filled up with core material 27, the substrate is irradiated with UV light 28 so that the core material becomes cured (FIG. 13D). Then, a clad material 30 is applied over the top surface, and is irradiated with UV light 28 so as to become cured. Thus, optical waveguides are formed (FIGS. 13E and 13F).

Figure 14A:
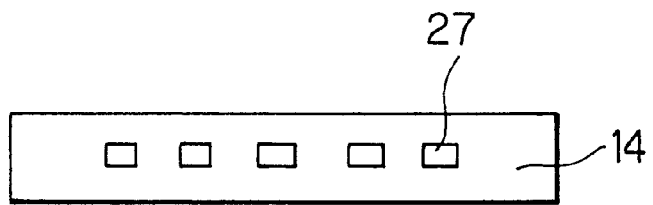
FIGS. 14A–14C are illustrative views showing an assembling method of three-layered optical waveguide array.
Figure 14B:
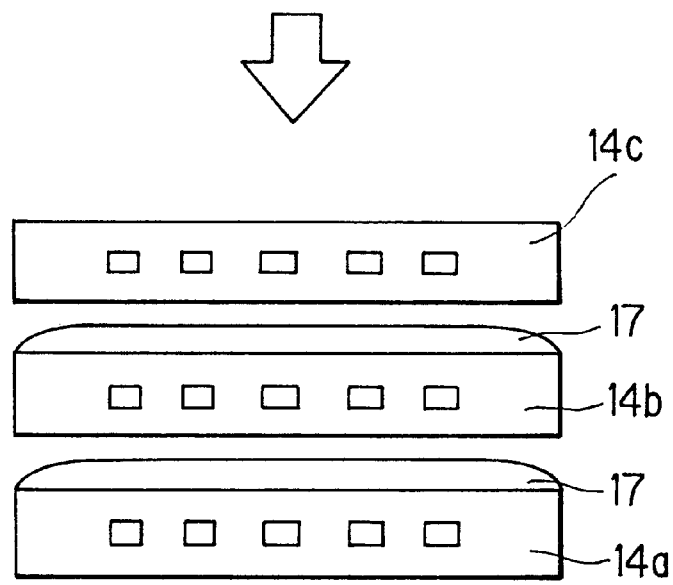
Figure 14C:
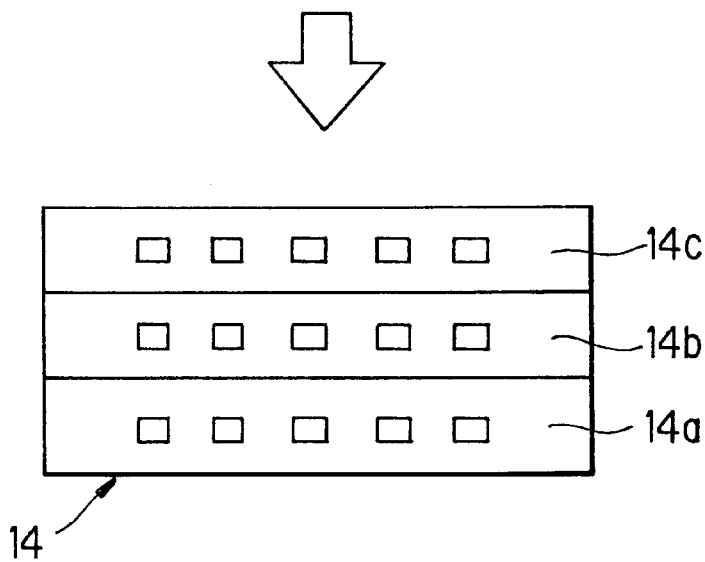

FIGS. 14A–14C show an assembling method in which the thus fabricated optical waveguide arrays are assembled into a three layered optical waveguide array. Three optical waveguide arrays 14a, 14b and 14c shown in FIG. 14A are prepared for R, G and B. These arrays are laminated in turn to form a three layer structure by applying an adhesive, as shown in FIG. 14B. Thus, a three-layer optical waveguide array 14 is fabricated (FIG. 14C).

Three-line color CCD 16 has light-receiving elements (photodiodes) formed at intervals of 14 μm in the horizontal direction, forming a light-receiving elemental array. The lines of the light-receiving elemental arrays are arranged at intervals of 125 μm in the vertical direction. Each line of the light-receiving elements has a respective color filter 19 of R, G or B, attached thereon, so that light enters the optical elements through color filter 19.

The above components are assembled into a color image sensor in the following manner. Bonded on the input portion of three-layer optical waveguide array 14 is microlens array 12 so that each waveguide corresponds to one microlens 12a. The NA (numerical aperture) of the microlens is set equal to that of the waveguide. This setting maximizes the coupling of the light from the original through cylindrical lens 11 into the waveguide and prevents light from the neighboring microlenses 12a from entering, to thereby achieve an improved resolution.

A three-line color CCD 16 is attached to the output portion of the waveguides so that each waveguide corresponds to one photodiode in the light-sensing portion. Then, cylindrical lens 11 is bonded onto the front face of microlens array 12. White fluorescent tube 10 for illuminating the original is set at a prescribed position.

Figure 15A:
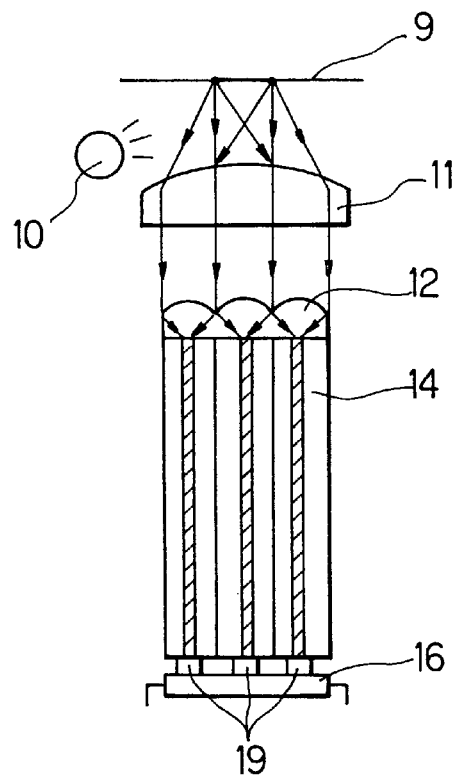
FIGS. 15A and 15B are illustrative views showing the operation of a color image sensor of the fifth embodiment.
Figure 15B:
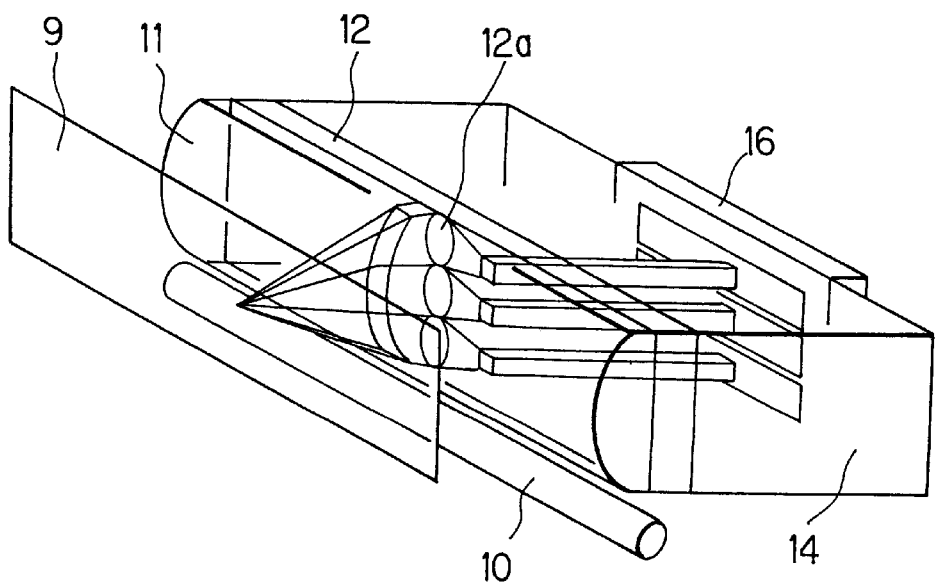

Next, the operation of this color image sensor will be explained. FIGS. 15A and 15B are illustrative views showing the operation of the color image sensor. Light emitted from white fluorescent tube 10 is reflected on an original 9 and is incident on cylindrical lens 11. The reflected light from a single line on the document will reach each of the three layered lines of microlens array 12 because of the optical characteristics of cylindrical lens 11. Microlens array 12 focuses the incident light on three layered optical waveguide array 14, which transmits the light to the light-receiving elements in three-line color CCD 16. Three-line color CCD 16 has R, G and B filters 19 attached thereon, so that R, G and B light beams are incident on the three lines of light-receiving elements where these light beams are converted into electric signals.

As a result, the light from the same line of original 9 is focused on the three lines for RGB provided in the output portion of the optical waveguides. Therefore, difference in reading position due to the distance between successive lines of optical waveguide array 14 and that of color CCD 16 will not be present, so that it is no longer necessary to provide external memory for deviation correction, thus achieving an improved speed of image reading. Further, the use of an optical waveguide reduction optical system readily makes the device compact.

6th Embodiment

Figure 16:
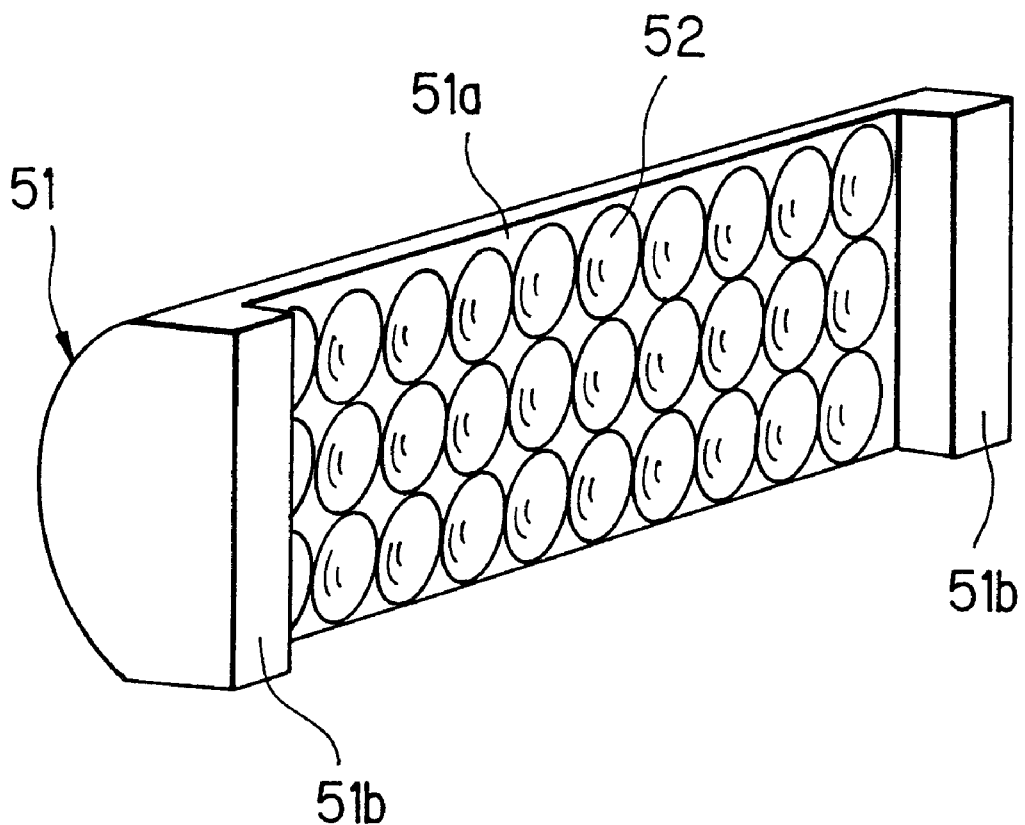
FIG. 16 is a configurational perspective view showing a cylindrical lens used in a color image sensor of the sixth embodiment in accordance with the invention.

FIG. 16 is a configurational perspective view showing a cylindrical lens used in a color image sensor of the sixth embodiment in accordance with the invention.

This cylindrical lens designated at 51 has convex microlens array 52 integrally formed on the flat surface 51*a* thereof. As in the fifth embodiment, cylindrical lens 51 is composed of polymethyl-methacrylate and is fabricated by injection molding. Cylindrical lens 51 has an effective diameter of 375 μm, a focal length of 1.5 mm, a lens thickness of 220 μm and a length of 220 mm. On the rear side of the cylindrical lens, convex microlenses having an effective diameter of 125 μm are formed at intervals of 125 μm in the horizontal direction and at intervals of 125 μm in the vertical direction.

Further, in order to create an air layer between microlens array 52 and optical waveguide input portion when the surface on which microlens array 52 is formed thereon and optical waveguide array 14 are bonded together, projection steps 51*b* are formed on the flat surface of cylindrical lens 51 at areas where no microlenses 52 are formed. Here, the height of projection steps 51*b* is designed so that the light image being incident on the microlenses having an effective diameter of 125 μm can be reduced to the core size of the optical waveguide input portion, specifically, 8×8 μm. The aforementioned cylindrical lens 51 is attached to the input portion of three-layer optical waveguide array 14, and color CCD 16 is attached to the output portion of three-layer optical waveguide array 14. White fluorescent tube 10 in the fifth embodiment is placed at a prescribed position.

Figure 17A:
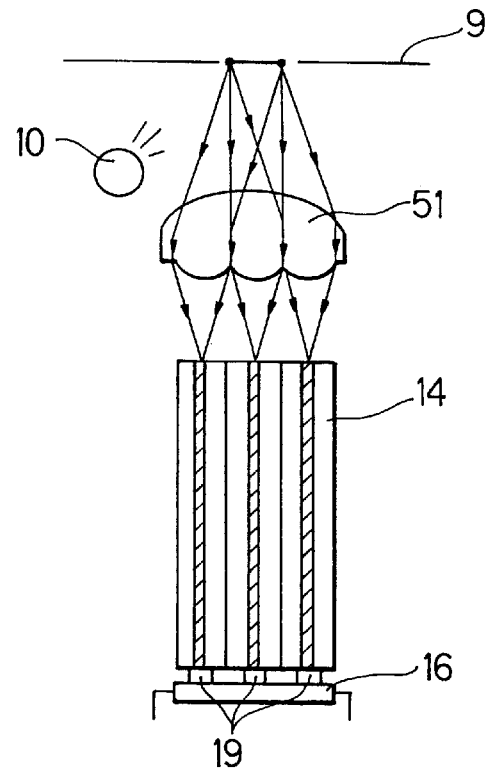
FIGS. 17A and 17B are illustrative views showing the operation of a color image sensor of the sixth embodiment.
Figure 17B:
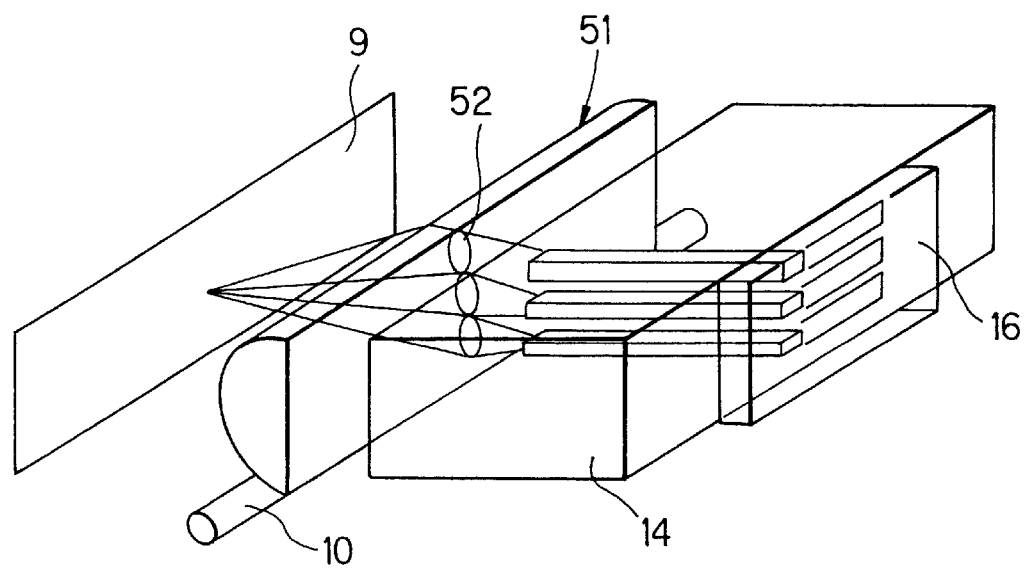

The operation of a color image sensor having this cylindrical lens 51 will be described. FIGS. 17A and 17B are illustrative views showing the operation of the color image sensor. As described in FIG. 16, the reflected light from one line on original 9 is focused on each of the lines of the optical waveguide array by means of cylindrical lens 51. Light beams having passed through R, G and B color filters 19 are incident on the three lines of light receiving elements of three-line color CCD 16 where these light beams are converted into electric signals.

In the above way, as in the fifth embodiment, difference in reading position due to the distance between successive lines of optical waveguide array 14 and that of color CCD 16 will not be present, so that it is no longer necessary to provide external memory for deviation correction, thus achieving an improved speed of image reading. Further, since a cylindrical lens is fabricated together with a microlens array by an integral molding process, it is possible to reduce the number of parts.

7th Embodiment

Figure 18:
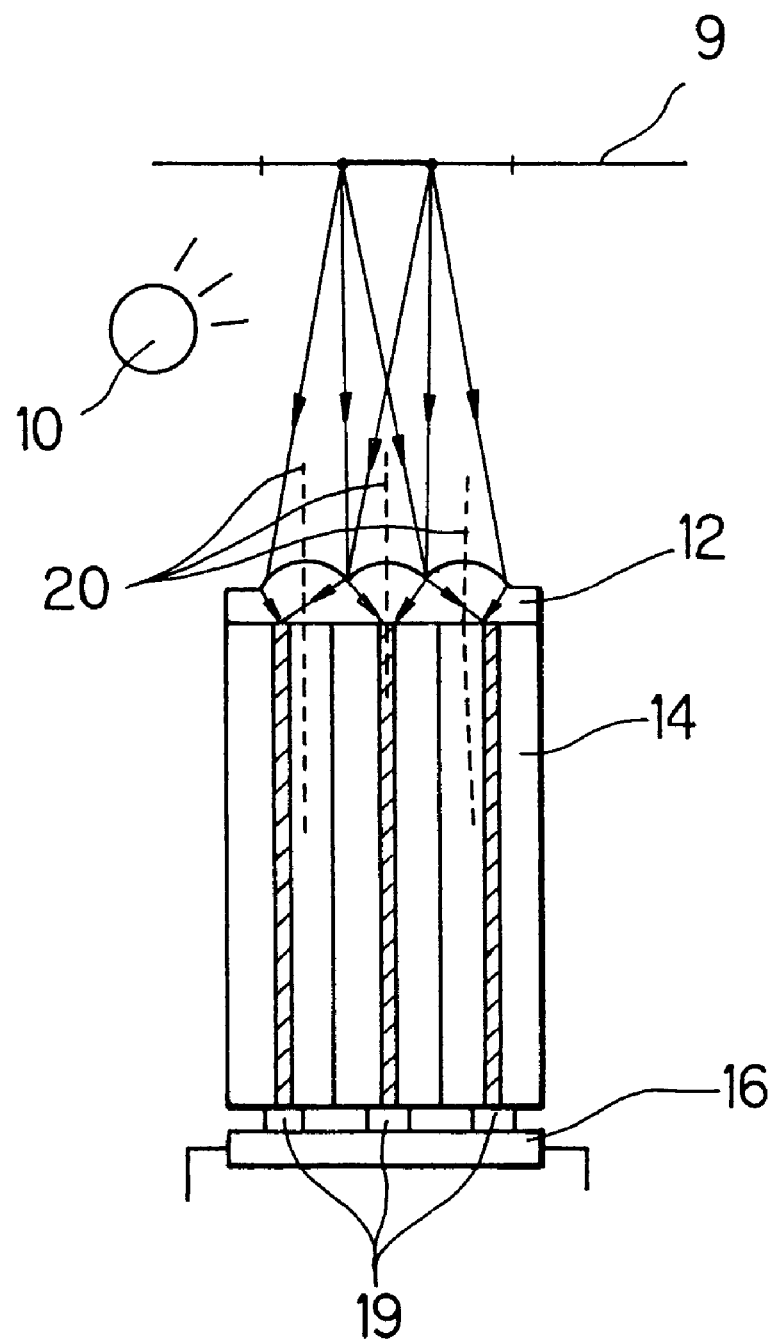
FIG. 18 a sectional view showing a color image sensor of the seventh embodiment in accordance with the invention.

FIG. 18 is a sectional view showing a color image sensor of the seventh embodiment in accordance with the invention.

This color image sensor has an image reading width of A4 size with a resolution of 200 dpi and comprises a white fluorescent tube 10 for illuminating an original 9, a vertically arranged three-row microlens array 12, a three-layer optical waveguide array 14, and three-line color CCD 16. This configuration does not use the cylindrical lens as was used in the fifth and sixth embodiments.

Microlens array 12 used in this embodiment has an effective diameter of 125 μm, a focal length of 270 μm and a lens thickness of 425 μm and the microlenses are arranged at intervals of 125 μm in the horizontal direction and at intervals of 125 μm in the vertical direction. As to three-layer optical waveguide array 14, the layer interval is set at 135 μm which differs from that of the optical waveguide array of the fifth embodiment. Further, color CCD 16 is the same as that used in the fifth embodiment except in that the CCD line distance is different therefrom, specifically set at 135 μm which is equal to the distance between successive waveguide layers. The distance between original 9 and microlens array 12 is set at 2 mm.

Next, a color image sensor is assembled using the above components in the following manner.

First, three-row microlens array 12 is aligned with three-layer optical waveguide array 14 in such a manner that the optical axes of the microlenses in the middle row of the three-row microlens array 12 correspond to the core centers of the waveguides in the middle layer and then the microlens array 12 is bonded to the input portion of three layered optical waveguide array 14 in a one-to-one correspondence. Next, color CCD 16 is bonded to the output portions of the waveguides so that the photodiodes in the light sensing portion of color CCD 16 are positioned in a one-to-one correspondence to the waveguides. White fluorescent tube 10 in the fifth embodiment is set at a prescribed position. As in the fifth embodiment, the NA of the microlenses and that of the waveguides are set equal.

In the above arrangement in the color image sensor, the center line of the cores in each outer layer of optical waveguide array 14 is positioned 10 μm off the central axis of the corresponding outer row of microlens array 12. This shift of 10 μm is for the following reasons.

Figure 19A:
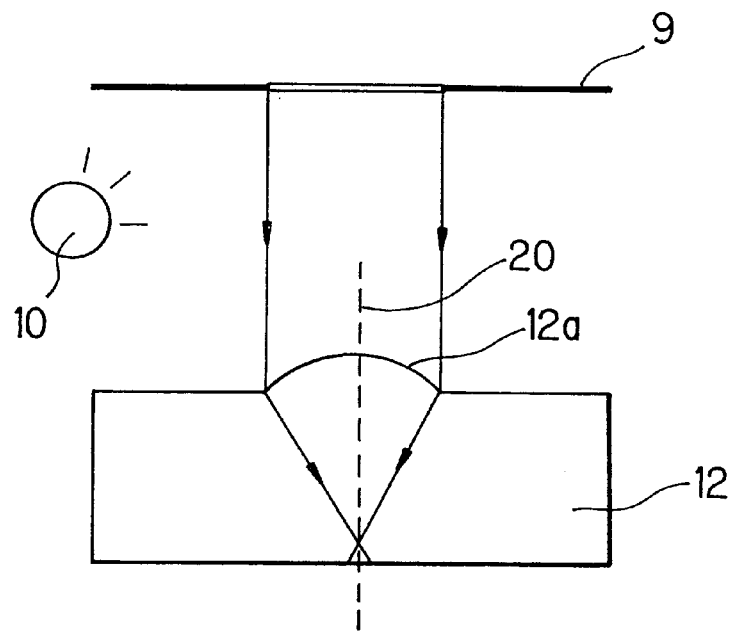
FIGS. 19A and 19B are illustrative views showing the operation of a color image sensor of the seventh embodiment.

First, a single microlens 12*a* having an effective diameter of 125 μm, a focal length of 270 μm and a lens thickness of 425 μm and an original 9 composed of a 125 μm white square area in a black background were prepared, as shown in FIG. 19A. With original 9 kept 2 mm apart from microlens 12*a*, the center of the image on the original was aligned with the optical axis of microlens 12*a*. Then, while original 9 being illuminated with white light, the position of the image formed on the underside of microlens 12*a* was measured.

Figure 19B:
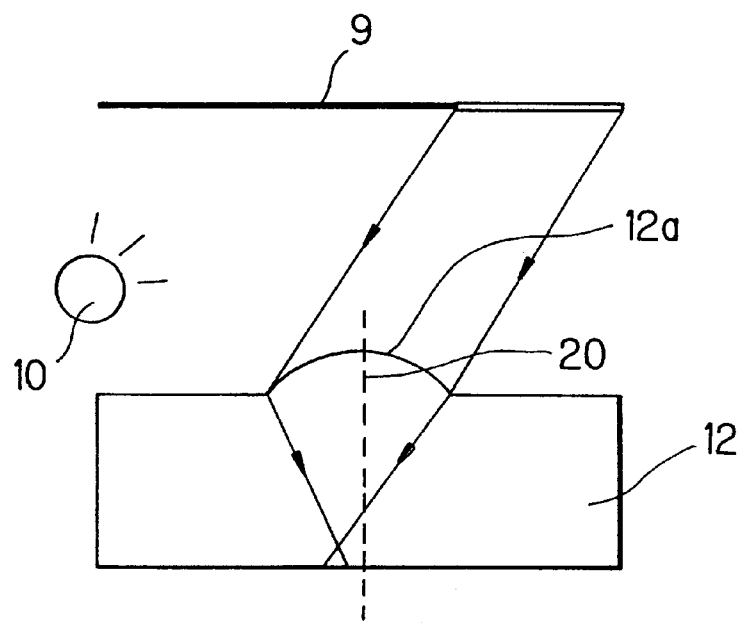

Next, original 9 was shifted 125 μm to one side, and the image formed on the underside of the microlens was observed. In this case, the image was observed to be shifted 10 μm to the opposite side of that of original 9 (FIG. 19B). Consequently, the incident light on microlens 12*a* at angle from a position 125 μm offset to one side will form an image at a position which deviates 10 μm from the position of optical axis 20 of the microlens 12*a*.

Accordingly, in the color image sensor of the seventh embodiment, taking this fact into account, the interval of the three waveguide layers is set 10 μm greater than the interval of the rows of microlens array 12, i.e., the lens distance at right angles to the waveguide layers. In this case, the center positions of the waveguide cores in the middle layer of three-layer optical waveguide array 14 is aligned to optical axes 20 of microlenses 12*a* which focus light on the middle layer of optical waveguide array 14. When image reading of original 9 is started, light incident on microlenses 12*a* in the middle row form images at positions along respective optical axes of microlenses 12a in the middle row. Light incident on microlenses 12a in the outer layers forms images at positions deviated from respective optical axes 20 of the microlenses 12a. Since the interval of optical waveguide layers is set taking this deviation into account, images can be focused at the positions corresponding to the outer optical waveguide layers.

Thus, the above color image sensor has the same functionality as that of the fifth or sixth embodiment, without needing a cylindrical lens.

In the fifth, sixth and seventh embodiments, a color CCD with built-in color filters 16 was used for the image sensor to achieve color recognition, but three single colors, or R, G and B filters may be provided to respective output portions of the three-layered optical waveguides in combination with three monochrome CCD image sensors. It is also possible to make the optical waveguide array have the function of the color filters. The description was made using the RGB filters, but any three color filter combination can be used as long as light beams passing through them are independent from each other and cover the complete range of colors.

Although a three-line color CCD was used, three one-line color CCDs may be used. In this case, the waveguides of the optical waveguide array may be formed so that the output portions from different layers are formed without overlapping each other and individual one-line color CCD's may be attached to respective waveguide output portions.

In accordance with the invention, three color filters which can extract independent color beams from the transmitted light are made correspondent to different waveguide layers and the acquired light beams are converted into electric signals by photoelectric converting device of line sensors. Accordingly, the production of this device is much easier and RGB signals for color recognition can be easily obtained by signal processing, compared to the horizontal type three-branched type image sensor which uses micro color filters to pick up color information. Further, in the invention, when the RGB color filters are used, the RGB signals can be directly obtained without any signal processing. Moreover, in accordance with the invention, by adding three kinds of substances which allow light to form three independent color beams that cover the complete range of colors, to the waveguides or to the clad layers, it becomes possible to achieve the functionality of the color filters without the necessity of any color filters. This also means the elimination of the assembling step of attaching the color filters, an improvement of the assembling performance.

In accordance with the invention, since a one-chip sensor of three lines is used, this can reduce the number of parts, making the device compact. According to the invention, since in the optical waveguide array, the output portions of different waveguide layers are arranged so that they do not overlap each other with respect to the layer direction, it is possible to use inexpensive one-chip sensors having light-receiving elements arranged in one line and arrange them in a non-overlapping manner. This configuration makes the device less expensive than the three-line sensor.

The invention offers a production method of a three-layer optical waveguide array, and this device can be produced much easier than the device with three branches in the perpendicular direction.

Furthermore, according to the invention, since a cylindrical lens is provided between the original and the microlens array, it is possible to conduct the reflected light from an identical portion of the original to different layers of the microlens array. As a result, it is possible to eliminate the positional deviations in image reading of the original, without the necessity of providing external memory for deviation correction which was needed in the conventional configuration. Thus, it is possible to achieve simplified high-speed image reading processing. Further, the provision of only a cylindrical lens is effective enough, this facilitates the fabrication, realizing a compact light-weighted device.

Furthermore, according to the invention, besides above-mentioned advantage, since the microlens is integrally formed with the optical waveguide array side of the cylindrical lens, assembly process can be further simplified, realizing a compact light-weighted device.

Finally, in accordance with the invention, since reflected light beams from the same part of the original with respect to the layered direction of the microlens array, are adapted to be focused at respective input ends of the three layered optical waveguides, it is possible to eliminate the positional deviations in image reading of the original, without the necessity of providing external memory for deviation correction which was needed in the conventional configuration. Thus, it is possible to achieve simplified high-speed image reading processing. Further, since no cylindrical lens is used, this facilitates the fabrication, realizing a compact light-weight device.

What is claimed is:

1. A color image sensor comprising:
   a white light source radiating white light on an original;
   a microlens array for condensing light emitted from said white light source and reflected from the original;
   an optical waveguide array having a plurality of waveguides which transmit the condensed light which has been focused by said microlens array; and
   a photoelectric converting device which receives light transmitted through the plurality of waveguides and converts the light into electric signals,
   said optical waveguide array having laminated structure made up of three waveguide layers, each waveguide layer having one of three color filters which allow light to form three independent color beams that cover the complete range of colors.

2. The color image sensor according to claim 1, wherein the color filters are red, green and blue.

3. A color image sensor comprising:
   a white light source radiating white light on an original;
   a microlens array for condensing light emitted from said white light source and reflected from the original;
   an optical waveguide array having a plurality of waveguides which transmit the condensed light which has been focused by said microlens array; and
   a photoelectric converting device which receives light transmitted through the plurality of waveguides and converts the light into electric signals,
   said optical waveguide array having a laminated structure made up of three waveguide layers, each waveguide layer having a different core substance of three kinds for creating three types of waveguides which allow light to form three independent color beams that cover the complete range of colors.

4. A color image sensor comprising:
   a white light source radiating white light on an original;
   a microlens array for focusing light emitted from said white light source and reflected from the original;
   an optical waveguide array having a plurality of waveguides which transmit the light which has been focused by said microlens array; and a photoelectric converting device which receives light transmitted through the plurality of waveguides and converts the light into electric signals, said optical waveguide array having a laminated structure made up of three layers of waveguides and clad layers over the waveguides, each clad layer having a different clad substance for creating three kinds of waveguides which allow light to form three independent color beams that cover the complete range of colors.

5. The color image sensor according to claim 1, wherein said photoelectric converting device comprises a one-chip sensor having light-receiving elements arranged in three lines, an interval between the lines of the light-receiving elements set equal to an interval between the waveguide layers and arranged such that each of the lines of the light-receiving elements is made correspondent to a respective waveguide layer of said optical waveguide array.

6. The color image sensor according to claim 2, wherein said photoelectric converting device comprises a one-chip sensor having light-receiving elements arranged in three lines, an interval between the lines of the light-receiving elements set equal to an interval between the waveguide layers and arranged such that each of the lines of the light-receiving elements is made correspondent to a respective waveguide layer of said optical waveguide array.

7. The color image sensor according to claim 3, wherein said photoelectric converting device comprises a one-chip sensor having light-receiving elements arranged in three lines, an interval between the lines of the light-receiving elements set equal to an interval between the waveguide layers and arranged such that each of the lines of the light-receiving elements is made correspondent to a respective waveguide layer of said optical waveguide array.

8. The color image sensor according to claim 4, wherein said photoelectric converting device comprises a one-chip sensor having light-receiving elements arranged in three lines, an interval between the lines of the light-receiving elements set equal to an interval between the waveguide layers and arranged such that each of the lines of the light-receiving elements is made correspondent to a respective waveguide layer of said optical waveguide array.

9. The color image sensor according to claim 1, wherein said photoelectric converting device comprises plural one-chip sensors each having light-receiving elements arranged in one line, said optical waveguide array is constructed so that waveguide output portions of different waveguide layers are arranged without overlapping each other, and each of the waveguide layers is arranged in correspondence with the light-receiving elements of a different one of the one-chip sensors.

10. The color image sensor according to claim 2, wherein said photoelectric converting device comprises plural one-chip sensors each having light-receiving elements arranged in one line, said optical waveguide array is constructed so that waveguide output portions of different waveguide layers are arranged without overlapping each other, and each of the waveguide layers is arranged in correspondence with the light-receiving elements of a different one of the one-chip sensors.

11. The color image sensor according to claim 3, wherein said photoelectric converting device comprises plural one-chip sensors each having light-receiving elements arranged in one line, said optical waveguide array is constructed so that waveguide output portions of different waveguide layers are arranged without overlapping each other, and each of the waveguide layers is arranged in correspondence with the light-receiving elements of a different one of the one-chip sensors.

12. The color image sensor according to claim 4, wherein said photoelectric converting device comprises plural one-chip sensors each having light-receiving elements arranged in one line, said optical waveguide array is constructed so that waveguide output portions of different waveguide layers are arranged without overlapping each other, and each of the waveguide layers is arranged in correspondence with the light-receiving elements of a different one of the one-chip sensors.

* * * * *